(No Model.)
S. HEIMANN.
ELECTRODE FOR ARC LAMPS.
No. 517,042. Patented Mar. 27, 1894.
Carbon
&
Ashes
&
Binding substance.
WITNESSES:
INVENTOR

UNITED STATES PATENT OFFICE.

SALOMON HEIMANN, OF NEW YORK, N. Y.

ELECTRODE FOR ARC LAMPS.

SPECIFICATION forming part of Letters Patent No. 517,042, dated March 27, 1894.

Application filed September 15, 1893. Serial No. 485,622. (No model.)

*To all whom it may concern:*

Be it known that I, SALOMON HEIMANN, a subject of the Emperor of Germany, and a resident of New York city, New York, have invented a new and useful Improvement in Electric-Arc-Light Carbons, of which the following is a specification.

The object of my invention is to provide an electrode for electric arc lamps, which is cheap and burns a long time.

In the accompanying drawing one of my improved electrodes, is shown in elevation parts being broken out.

My improved carbons are made in the following manner. Finely pulverized ashes of peat, or wood, coal or coke, are mixed with pulverized coal or coke and a binding substance, such as silicate of potash or silicate of soda, and small quantities of finely pulverized asbestus and plumbago. Equal quantities of the ashes of peat or of wood, coal or coke are mixed with equal parts of pulverized coal or coke; then I add about ten per cent. of pulverized asbestus, five per cent. of plumbago, all finely powdered and thoroughly mixed; then I add above five per cent. of silicate of soda or silicate of potash as a binder and enough water to produce a dough that can easily be manipulated. This dough is then placed in suitable molds and thoroughly pressed in a hydraulic press and then dried and baked.

The carbons or electrodes made in the above manner have burned more than double the time of the electric light carbons or electrodes used heretofore, produce a very brilliant light and are not expensive.

I claim—

1. An electrode for electric arc lights, composed of a mixture of powdered ashes, carbon and a binding substance, substantially as set forth.

2. An electric light electrode, composed of a mixture of ashes, carbon, plumbago, asbestus and a binding substance, substantially as set forth.

In testimony whereof I affix my signature in presence of two witnesses.

SALOMON HEIMANN.

Witnesses:
HUGO COHN,
WILLIAM H. GEIGER.